April 11, 1967 H. S. JONES, JR., ET AL 3,314,027

STEP TWIST DIODE MICROWAVE SWITCH

Filed Oct. 14, 1964

INVENTORS
HOWARD S. JONES, JR.
ROBERT V. GARVER

BY Harry M. Saragovitz, Edward J. Kelly, Herbert Berl & J. D. Edgerton
ATTORNEYS

United States Patent Office 3,314,027

Patented Apr. 11, 1967

3,314,027

STEP TWIST DIODE MICROWAVE SWITCH

Howard S. Jones, Jr., Washington, D.C., and Robert V. Garver, Rockville, Md., assignors to the United States of America as represented by the Secretary of the Army Filed Oct. 14, 1964, Ser. No. 403,962
10 Claims. (Cl. 333—21)

Figure 1:
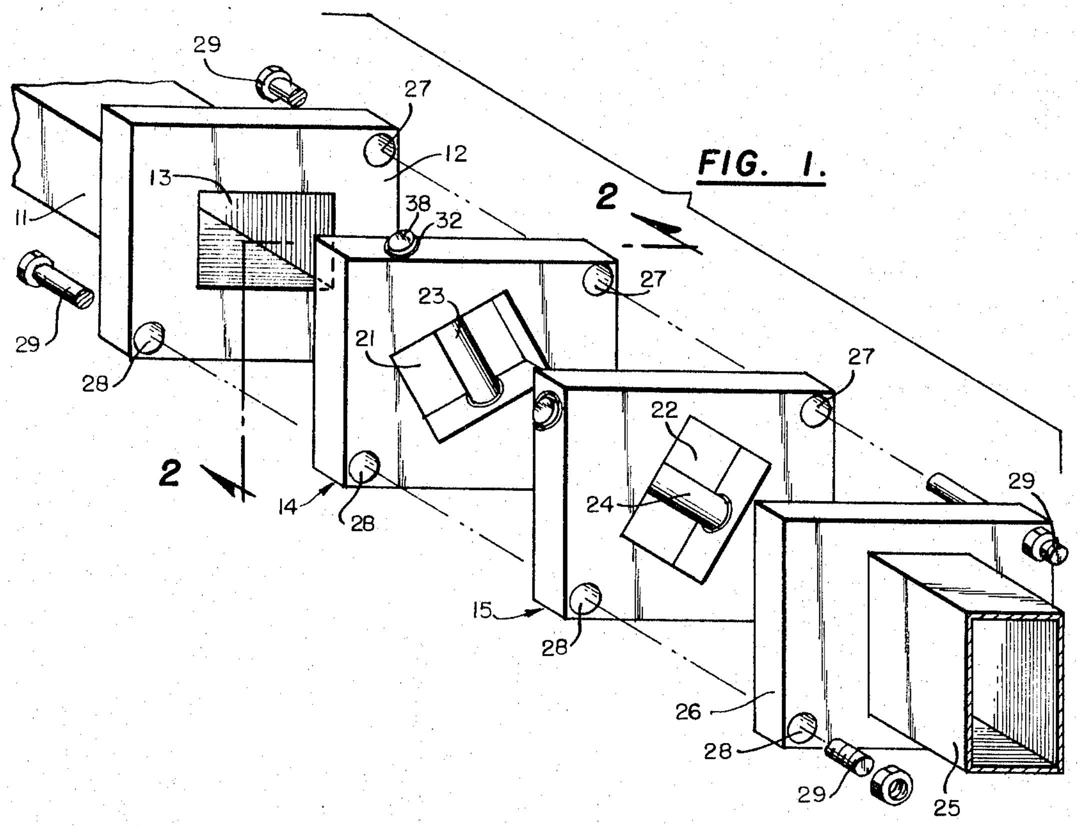

The invention described herein may be manufactured and used by or for the Government of the United States of America for governmental purposes without the payment of any royalties thereon or therefor.

This invention relates to signal transmission lines, and more particularly to wave guides and similar structures in which the plane of polarization of the energy transmitted therethrough is changed and in which the flow of energy may be switched on and off as desired.

Switching systems for high frequency electrical energy are not new. In most transceiver systems (a transceiver is a system which includes a radio transmitter and receiver in a single installation and in which the two units usually share some equipment) a switch is included in the transmission path between the receiver and the common antenna to prevent the high power energy from the transmitter, during transmission, from overloading and burning out the input stages of the receiver. Several different types of T–R switches have been used in the past. Each has its own advantages and disadvantages. In addition to T–R switching, there are times when the flow of high frequency energy along a wave guide is to be interrupted so that energy from another source can be substituted, or to provide for pulse or time modulation, or, in reflective systems, to permit the transmitted energy time to be reflected from the target without interference from additionally transmitted energy.

Very often in transceiver installations, space is limited, and it is difficult to include all of the desired equipment in the installation. This is becoming particularly true in the more recent installations in space vehicles and other far ranging vehicles which require a large proportion of available space for the storage of fuel.

When a transceiver installation is constructed, it is not always possible to orient the transmitter and receiver outputs and the antenna feed so that the wave guide can be directly coupled from one to the other without some modification in the size, the shape or the arrangement of the parts. One element which is often required in the wave guide is a twist section which enables a rectangular guide to be connected to the antenna input and to the transceiver output even though the aperture axes of the two may not be oriented the same. A twist requires installation space; switching devices require installation space; and matching devices require installation space; all to ensure the proper transmission and control of the maximum amount of high frequency energy with the smallest amount of loss.

It is an object of this invention to provide a new and improved section for wave guides.

It is another object of this invention to provide a new and improved section for wave guides to conserve space.

It is a further object of this invention to provide a new and improved section for wave guides, which section is used to accomplish the change of polarization of the wave transmitted therethrough.

It is still another object of this invention to provide a new and improved section of wave guide, which section is used to accomplish the switching control of energy flowing through it.

It is still a further object of this invention to provide a new and improved section for wave guides, which section is used to accomplish the control of the energy flowing through the guide while modifying its plane of polarization.

Figure 2:
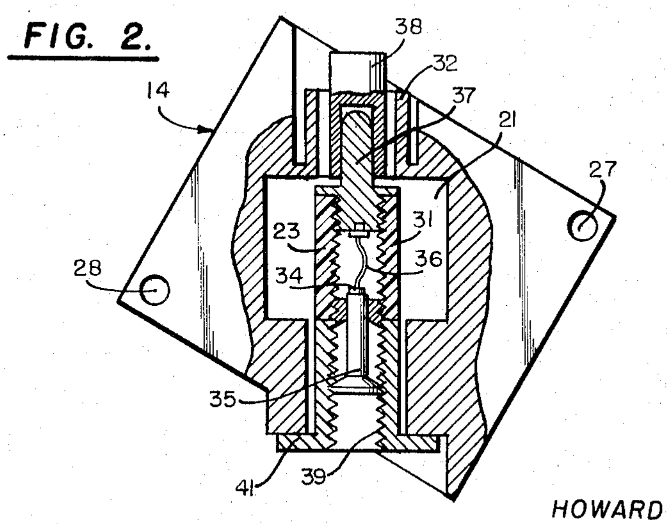

Other objects and advantages of this invention will become apparent as the following description proceeds, which description should be considered together with the accompanying drawings in which:

FIG. 1 is an exploded perspective view, partially in section, of the wave guide section of this invention, and FIG. 2 is a sectional view of one portion of the wave guide section of FIG. 1, taken along the line 2—2.

Referring now to the drawings in detail, the reference character 11 designates a portion of a rectangular wave guide which has its larger dimension horizontal. A flange 12 is attached to the end of the wave guide 11. Two wave guide sections 14 and 15 comprise a step twist for rotating the plane of polarization of the energy being transmitted therethrough by 90°. The section 14 comprises a quarter wave length section of guide which has its larger dimension at an angle of approximately 30° with the horizontal. The second section 15 comprises a quarter wave length section of rectangular wave guide 22 which has its larger dimension at an angle of approximately 60° with the horizon. The remainder of the wave guide itself is shown at 25, continuing with its larger dimension vertical. A flange 26 is attached to one end of the wave guide 25. Holes 27 and 28 perforate a pair of corners of each of the flanges 12 and 26 and the sections 14 and 15, and a pair of bolts 29, or rivets or other fastening means, serves to align the flanges and the quarter wave guide section 14 and 15 and to hold the entire assembly rigidly together. Other fastening means may be used if desired.

As shown in FIG. 1, the larger dimension of the wave guide section 11 is horizontal and that of section 25 is vertical. This twist of the guide through an angle of approximately 90° is accomplished in the device of this invention in three discrete steps, by means of the two portions 14 and 15. As mentioned above, each of the portions 14 and 15 is one quarter wave length long, to provide a compact device.

In addition to modifying the polarization of the energy transmitted through the wave guide, the portions 14 and 15 are designed to accomplish effective switching of that energy. A diode switch 23 is provided in the portion 14 and a diode switch 24 is provided in the portion 15. Thus, in each quarter wave portion 14 and 15, there is provided a discrete twist of about 30° and a diode switch 23 or 24. The construction of the individual switch is better shown in FIG. 2, which is a section taken along the line 2—2 of FIG. 1, showing the diode switch 23 in the portion 14.

The switch itself comprises a cartridge or casing 31 of electrically insulating material which is generally cylindrical in form and about a quarter wave length long. The wave guide section 14 is formed to accept the switch 23, and an annular projection 32, which is spaced from but surrounds the upper part of the switch 23, serves as a choke. The diode itself comprises a block of a semiconductor such as germanium 34 mounted on a pedestal 35 and in contact with a fine wire spring 36 to form a point contact. The wire spring 36 is supported in a top, electrically conductive member 37 which fits at least partially in the casing 31 and which extends outwardly therefrom to form a terminal portion 38. It is this terminal portion or cap which is adjacent the choke 32. The pedestal 35 is also electrically conductive and is threaded into a cylindrical terminal portion 39 which has a rim 41 in contact with the bottom of the section 14 although for illustrative purposes cylindrical terminal portion 39 has been shown in the drawing to be approximately as long as casing 31, it in fact is much shorter and is not as long as a quater wavelength. Further, a gap is shown between portion 39 and waveguide section 14; however, it must be pointed out that this gap is minimal and introduces no significant error. The switches 23 and 24 are identical and are mounted in the same way in the two portions 14 and 15. Thus, the illustration and description of the switch 23 will serve for both.

The switches 23 and 24 themselves are not new. But their incorporation in the two portions of a step twist is new, and has, heretofore, been considered unlikely. In the past, the classic twist for a rectangular wave guide was a smooth spiral of the guide itself. Such a twist is shown in FIG. 33 on page 44 of Microwaves and Wave Guides, Navships 903–5, published by the Bureau of Ships, U.S. Navy Department, and is available from the Superintendent of Documents, U.S. Government Printing Office, Washington 25, D.C. The twist of FIG. 33 is a smooth spiral twist of the guide itself, and it is shown to be two wave lengths long. Both the use of the smooth spiral and the length of two wave lengths were to provide the energy with as little disturbance as possible to avoid the inadvertent insertion of mismatched impedance, the loss of power, and the establishment of reflections and standing waves. Generally, those skilled in the art agreed that sudden changes in the interior of the wave guide, both by the walls of the guide and by projections into the interior were to be avoided. This invention contemplates changing the orientation of the wave guide in sudden, discrete steps, and, to add to the sudden changes, to insert directly into the path of the energy trying to recover from the sudden shift in direction, another impediment, the diode switch. However, it has been found that the combination works quite well, particularly when some precautions are taken.

A single diode switch in a wave guide operates well, but it has been found that two such switches in tandem provide much better switching action. For best operation, the two switches should be separated by an odd number of quarter wave lengths. For the broadest bandwidth of energy transmitted and controlled by the switches, the number of quarter wave lengths separating them should be maintained at a minimum. Therefore, the best operating conditions are achieved when the two diode switches 23 and 24 are separated by a single quarter wave length. To achieve this and conserve wave guide space, one of the diode switches is incorporated into each of the two portions of the step twist, each portion being one quarter wave length long. Thus, the proper spacing of the diode switches is automatically achieved. In addition, the germanium 34 is positioned so that it will appear to be at the end of a one-quarter wavelength transmission line to the high frequency energy in the waveguide. With the choke 32 built into the switch for phase correction and coupling purposes, the entire assembly operates very well. A single crystal switch will provide about 25 to 35 db (decibels) isolation. With two such switches in tandem separated by about a quarter wave length, isolations in the order of 55 to 65 db are obtained. A more complete discussion of the construction and operation of the diode switches themselves is found in Microwave Semiconductors Switching Techniques, by R. V. Garver, E. G. Spencer and M. A. Harper, published in IRE Transactions on Microwave Theory and Techniques, vol. MTT–6, number 4, October 1958, pp. 378–383.

Thus, by the combination of a step twist which rapidly rotates the plane of polarization of the wave guide energy in three discrete and sudden steps, and a pair of diode switches, all of which occupy little more than half a wave length of wave guide, two important functions can be accomplished with high frequency energy in very little space.

The operation of the step twist is fairly clear. As the high frequency energy passes through the constricted area of the aperture at the junction of, say, wave guide portion 25 and the twist portion 15, the planes of propagation of both the magnetic and electrical fields shift to remain parallel to the sides of the guide. The sudden discontinuity of the guide at the junction gives rise to some new, and possibly undesirable, modes of transmission, but the restricted aperture at the junction serves as a filter to remove them. Although the switch 24, which is in the portion 15, presents another discontinuity in the path of transmission of the high frequency energy, it is made a quarter wave length long and serves as a quarter wave transmission line itself. Therefore, the switch transforms, or inverts, the impedance of the diode. When the diode conducts, it appears to the energy in the wave guide as essentially the characteristic impedance of the line. But when the diode is open, nonconducting, it appears to the energy in the wave guide as a very low impedance across the guide. This discontinuity serves as a mismatch and reflects back toward the source, most of the energy being transmitted through the guide portion 25.

By reason of the placement of the switches in the twist portions, the proper spacing is maintained between switches. The twist portions 14 and 15 need not, of course, be rotated 30° each, but may be rotated any similar amount depending upon the circumstances of the particular installation. The example of this application is based upon the rotation of the polarization a full 90°. Other amounts of rotation may be desirable, and the twist may include more than two sections. In this example, the twist was shown as two separate sections which could be formed of brass, for example, with the rectangle representing the guide aperture milled or otherwise cut through the sections. Such a twist can also be formed of a single piece of brass or the like which is one half wave length thick. The two apertures can be milled separately, one from each side of the brass block, at the proper angular relation to each other. Also, the diodes need not be germanium or point contact rectifiers, but may be any device suitable for the purpose.

This specification has described a new and improved accessory for wave guides, which accessory serves two functions in a manner which would normally be considered by those skilled in the art to be ineffective and disruptive. This specification has described a step twist which rotates the plane of polarization of the energy being transmitted through a wave guide in discrete steps. The steps of the twist contain therein diode switches for controlling the flow of energy through the guide. Contrary to expectations, not only does the step twist-diode switch combination of this invention not disrupt the transmission of the energy through the wave guide, but it accomplishes both rotation of the plane of the polarization of the energy and switching of it, all in a space which is extremely small. It is realized that this description may suggest to those skilled in the art other ways in which the principles of this invention may be used without departing from its spirit. It is, therefore, intended that this invention be limited only by the scope of the appended claims.

What is claimed is:

1. A rectangular wave guide section for the transmission of high frequency electromagnetic energy therethough, said section comprising a first twist portion and a second twist portion, the larger dimensions of the rectangle of each of said portions being at an angle with respect to that of the other portion, and switching means contained within each of said portions for controlling the flow of energy through said two portions.

2. A step twist switching device for rectangular wave guides, said device comprising two rectangular wave guide sections each a quarter wave length long, the corresponding sides of each of said wave guide sections being rotated from those of the other by a fixed angle, a diode switch device contained wherein each of said sections situated approximately in the center thereof and extending across the shorter dimension of said section, and means for fastening said two sections together and to other wave guide sections.

3. A switching station for a wave guide, said station comprising a twist section of wave guide for rotating the planes of energy transmission from a first plane to a second plane which is angularly related to the first plane, said section comprising at least a first portion and a section portion of rectangular wave guide, the sides of said first portion being angularly related to the corresponding sides of the second portion, and at least one diode switching member supported in said first portion of said twist section generally perpendicular to said shorter dimension, said diode switching member comprising a diode and a casing.

4. The station defined in claim 3 wherein said casing is formed as a quarter wave length transmission line at the operating frequencies of said wave guide so that a conducting diode appears as approximately the characteristic impedance of the wave guide.

5. A wave guide section for modifying the polarization of the energy being transmitted and for controlling the flow of that energy, said section comprising at least a first portion and a second portion, each of said portions being rectangular in cross-section and having the corresponding sides of one angularly disposed with respect to the corresponding sides of the other, the sides of both of said portions being angularly disposed with respect to the sides of the other sections of the wave guide to which the section is to be connected, at least one controlled diode, said diode being mounted in the approximate longitudinal center of said first portion, a generally cylindrical casing surrounding said diode, said casing being approximately one quarter wave length long and extending across the smaller dimension of said first portion, and means interconnecting said first portion and said diode for compensating for phase modifications produced by said diode and said first portion structure.

6. The section defined in claim 5 wherein each of said first and second portions is approximately one quarter wave length long.

7. The section defined in claim 6 further including a second diode having a second casing approximately a quarter wave length long surrounding said second diode, said second diode being situated in said second portion in a location and position corresponding to the situation of said first diode in said first portion.

8. A section of rectangular wave guide for accomplishing a plurality of functions in a limited space, said section comprising a first portion and a second portion of rectangular wave guide, the sides of said first portion being situated at an angle to the corresponding sides of said second portion and to the corresponding sides of a wave guide with which the section is to be used so as to rotate the plane of polarization of high frequency energy being transmitted therethrough in a plurality of discrete steps, a first switching means incorporated in said first portion, said first switching means comprising a point contact diode and a casing surrounding said diode, said casing being generally cylindrical in shape and about a quarter wave length long, said casing being situated in the approximate longitudinal center of said first portion and across the smaller dimension of said first portion, and means coupling said switching means to said first portion comprising at least one high frequency impedance for modifying the impedance of said first portion.

9. The section defined in claim 8 further including a second switching means incorporated in said second portion, said second switching means comprising a point contact diode and a casing surrounding said diode, said casing being generally cylindrical in shape and about a quarter wave length long, said casing being situated in the approximate longitudinal center of said second portion and said across the smaller dimension thereof, and means comprising at least one high frequency impedance for coupling said switching means to said second portion and for modifying the impedance of that second portion.

10. An improved waveguide transmit-receive switch and coupling element which accomplishes the switching function and rotates the plane of polarization of the energy being transmitted therethrough to accommodate a different orientation of the input and output aperture axes while requiring a minimal amount of space, comprising a first portion and a second portion of rectangular waveguide each having a transmission length of one-quarter wavelength, the sides of said first portion being situated at an angle to the corresponding sides of said second portion so as to rotate the plane of polarization of the high frequency energy being transmitted therethrough in a plurality of discrete steps to correspond to the difference in angular orientation of the apertures of the waveguide sections to which said switch is adapted to be connected, a first switching means incorporated into said first portion and a second switching means incorporated into said second portion, each of said switching means comprising a point contact diode and a casing surrounding said diode, said casing being generally cylindrical in shape and about a quarter wavelength long, each said casing being situated in the approximate longitudinal center and across the smaller dimension of each said portion such that said switches are one-quarter wavelength, and means coupling each said switching means to its respective wavelength portion comprising at least one high frequency impedance for modifying the impedance of each said portion.

References Cited by the Examiner

UNITED STATES PATENTS

| | | | |
|---|---|---|---|
| 2,736,867 | 2/1956 | Montgomery | 333—98 X |
| 2,968,771 | 1/1961 | DeLoach | 333—98 X |
| 3,178,660 | 4/1965 | Smith | 333—24 |

OTHER REFERENCES

IRE Transactions on Microwave Theory and Techniques "Microwave Semiconductor Switching Techniques" by R. V. Garver, F. G. Spencer, and M. A. Harper, vol. MTT–6, No. 4, October 1958, page 380.

HERMAN KARL SAALBACH, *Primary examiner.*

ELI LIEBERMAN, *Examiner.*

M. NUSSBAUM, *Assistant Examiner.*